United States Patent
Tyou et al.

(10) Patent No.: US 11,509,657 B2
(45) Date of Patent: Nov. 22, 2022

(54) DETERMINATION DEVICE, DETERMINATION METHOD, AND DETERMINATION PROGRAM

(71) Applicant: NIPPON TELEGRAPH AND TELEPHONE CORPORATION, Tokyo (JP)

(72) Inventors: Iifan Tyou, Musashino (JP); Masaki Tanikawa, Musashino (JP); Yukio Nagafuchi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 54 days.

(21) Appl. No.: 15/734,558

(22) PCT Filed: Jun. 5, 2019

(86) PCT No.: PCT/JP2019/022428
§ 371 (c)(1),
(2) Date: Dec. 3, 2020

(87) PCT Pub. No.: WO2019/235550
PCT Pub. Date: Dec. 12, 2019

(65) Prior Publication Data
US 2021/0234863 A1    Jul. 29, 2021

(30) Foreign Application Priority Data

Jun. 6, 2018  (JP) .............................. JP2018-109040

(51) Int. Cl.
*H04L 9/40* (2022.01)
*G16Y 30/10* (2020.01)

(52) U.S. Cl.
CPC .......... *H04L 63/102* (2013.01); *H04L 63/107* (2013.01); *G16Y 30/10* (2020.01)

(58) Field of Classification Search
CPC ..... H04L 63/102; H04L 63/107; H04L 63/14; H04L 63/1408; G16Y 30/10; G16Y 40/10; G16Y 40/50
See application file for complete search history.

(56) References Cited

U.S. PATENT DOCUMENTS 9,628,499 B1 * 4/2017 Yu ...................... H04L 63/1416
10,333,958 B2 * 6/2019 Huang ................ H04L 63/1425
(Continued)

FOREIGN PATENT DOCUMENTS

| JP | 2008-75495 | A |   | 4/2008 |
| JP | 2009-135649 | A |   | 6/2009 |
| JP | 2009135649 | A | * | 6/2009 |

OTHER PUBLICATIONS

X. Wang, T. Q. S. Quek, M. Sheng and J. Li, "Throughput and Fairness Analysis of Wi-Fi and LTE-U in Unlicensed Band," in IEEE Journal on Selected Areas in Communications, vol. 35, No. 1, pp. 63-78, Jan. 2017, doi: 10.1109/JSAC.2016.2632629. (Year: 2017).*

(Continued)

*Primary Examiner* — Theodore C Parsons
*Assistant Examiner* — Sameera Wickramasuriya
(74) *Attorney, Agent, or Firm* — Xsensus LLP

(57) ABSTRACT

A determination apparatus according to a first embodiment collects information regarding communication performed by an IoT device. The determination apparatus extracts patterns used for detecting unauthorized communication performed by the IoT device from information that has been collected. Also, the determination apparatus approximates a change in the cumulative value of the number of patterns to a function that expresses a predetermined curve, thereby calculating the degree of convergence of the change. Also, the deter- (Continued)

mination apparatus determines whether or not the degree of convergence is no less than a predetermined value.

12 Claims, 6 Drawing Sheets

(56) References Cited

U.S. PATENT DOCUMENTS

| | | | | |
|---|---|---|---|---|
| 10,581,902 | B1* | 3/2020 | Krishtal | H04L 63/0236 |
| 2006/0259620 | A1* | 11/2006 | Tamai | H04L 43/028 |
| | | | | 709/225 |
| 2008/0066727 | A1 | 3/2008 | Kato et al. | |
| 2016/0048114 | A1* | 2/2016 | Matthieu | G05B 15/02 |
| | | | | 700/83 |
| 2016/0330226 | A1* | 11/2016 | Chen | H04L 29/06877 |
| 2018/0027004 | A1* | 1/2018 | Huang | H04L 43/08 |
| | | | | 726/23 |
| 2019/0098039 | A1* | 3/2019 | Gates | G16H 50/70 |
| 2019/0182170 | A1* | 6/2019 | Kulkarni | H04L 47/25 |

OTHER PUBLICATIONS

Kovacs, Istvan Z., et al. "Mobile broadband traffic forecast modeling for network evolution studies." 2011 IEEE Vehicular Technology Conference (VTC Fall). IEEE, 2011. (Year: 2011).*

Wood, Daniel, Noah Apthorpe, and Nick Feamster. "Cleartext data transmissions in consumer iot medical devices." Proceedings of the 2017 Workshop on Internet of Things Security and Privacy. 2017. (Year: 2017).*

Bello, Oladayo, and Sherali Zeadally. "Intelligent device-to-device communication in the internet of things." IEEE Systems Journal 10.3 (2014): 1172-1182. (Year: 2014).*

International Search Report dated Jul. 9, 2019 in PCT Application No. PCT/JP2019/022428, Filed on Jun. 5, 2019, 1 page.

Japanese Office Action dated Jul. 6, 2021, in corresponding Japanese Patent Application No. 2018-109040.

* cited by examiner

DETERMINATION DEVICE, DETERMINATION METHOD, AND DETERMINATION PROGRAM

CROSS-REFERENCE TO RELATED APPLICATIONS

The present application is based on PCT filing PCT/JP2019/022428, filed Jun. 5, 2019, which claims priority to JP 2018-109040, filed Jun. 6, 2018, the entire contents of each are incorporated herein by reference.

TECHNICAL FIELD

The present invention relates to a determination apparatus, a determination method, and a determination program.

BACKGROUND ART

Conventionally, there is a known method for detecting unauthorized communication in a communication device such as an IoT device, through which information regarding communication performed by the communication device is collected, the collected information is analyzed, and patterns of communication are learnt. In this regard, a method for collecting information only within a predetermined specific period, and a method for collecting information until the number of extractable patterns reaches a predetermined target number are known as methods for collecting information to be learnt.

CITATION LIST

Non Patent Literature

[NPL 1] Tsuyoshi Ide, *Nyumon Kikaigakushuniyoru Ijoukenchi—Rniyoru Jissen Gaido—* (Introduction to Anomaly Detection using Machine Learning), CORONA PUBLISHING CO., LTD, ISBN: 978-4-339-02491-3

SUMMARY OF THE INVENTION

Technical Problem

However, conventional methods for collecting information has a problem in that it may be difficult to efficiently collect information regarding communication performed by an IoT device. Generally, unlike general-purpose devices that are used for browsing websites, for example, an IoT device that is used as a dedicated device has limited communication destinations, for example, and patterns of communication that occurs are likely to be limited. Therefore, it is envisaged that the patterns of communication performed by the IoT device can be efficiently covered by collecting information regarding communication performed by the IoT device without excess or deficiency.

With a method for collecting information only during a specific period, it is possible that the set period is too long and information continues to be collected even after sufficient information has been collected, or the set period is too short to collect sufficient information, for example.

Also, with a method for collecting information until the number of extractable patterns reaches a predetermined target number, it is difficult to set a target number that is not too large or too small because the number of patterns required to perform sufficient learning varies for each device.

Means for Solving the Problem

In order to solve the above-described problems and achieve an object, a determination apparatus includes: a collection unit that collects information regarding communication performed by a device; an extraction unit that extracts patterns that are used to detect unauthorized communication performed by the device, from the information collected by the collection unit; a calculation unit that approximates a change in a cumulative value of the number of patterns to a function that expresses a predetermined curve, thereby calculating a degree of convergence of the change; and a determination unit that determines whether or not the degree of convergence is no less than a predetermined value.

Effects of the Invention

According to the present invention, it is possible to efficiently collect information regarding communication performed by an IoT device.

DESCRIPTION OF EMBODIMENTS

The following describes embodiments of a determination apparatus, a determination method, and a determination program according to the present application in detail with reference to the figures. Note that the present invention is not limited to the embodiments described below.

[Configuration of First Embodiment]

Figure 1:
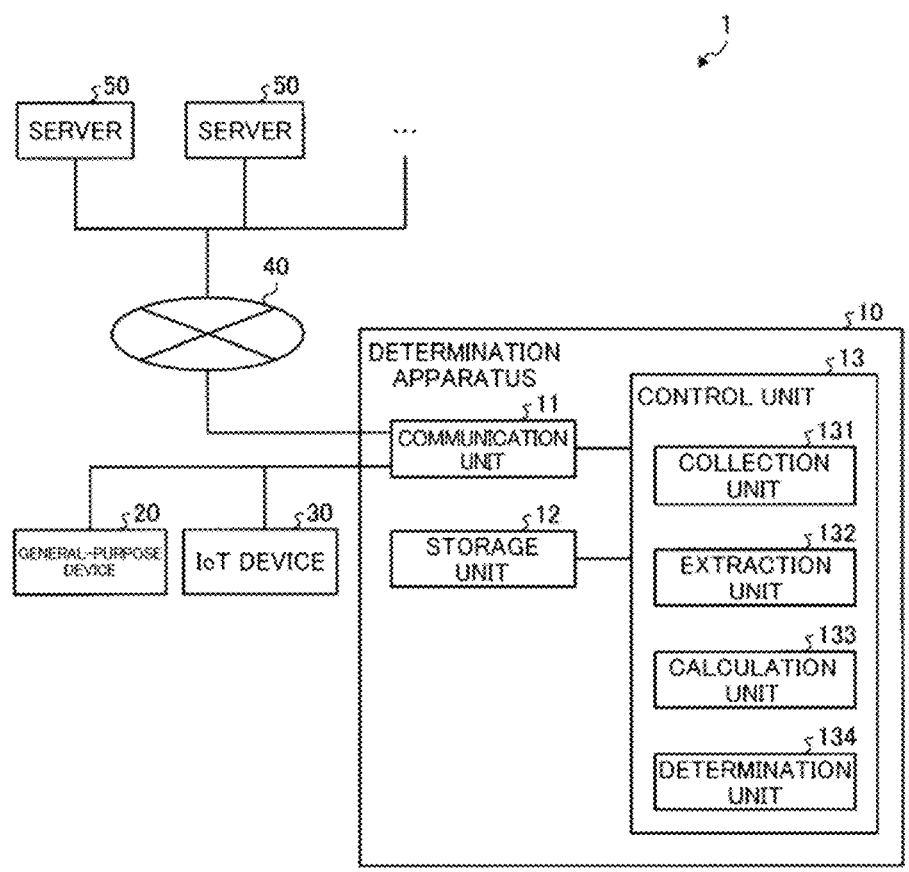
FIG. 1 is a diagram showing an example of a configuration of a determination apparatus according to a first embodiment.

First, a configuration of a determination apparatus according to a first embodiment will be described with reference to FIG. 1. FIG. 1 is a diagram showing an example of the configuration of the determination apparatus according to the first embodiment. As shown in FIG. 1, a determination apparatus 10 is connected to a general-purpose device 20 and an IoT device 30. The determination apparatus 10 is also connected to servers 50 via a network 40.

For example, the determination apparatus 10 is a gateway apparatus for connecting the general-purpose device 20 and the IoT device 30 to the network 40. For example, the network 40 is the Internet.

Here, the general-purpose device 20 is an information processing device that has a communication function and is used for a general purpose, such as a server machine, a personal computer, or a smartphone. On the other hand, the IoT device 30 is a device that is used for a dedicated purpose and is equipped with a communication function. For example, the IoT device 30 is any kind of device such as an operation monitoring sensor in a factory or the like, an automobile, a payment terminal, or a monitoring camera, to which a communication function is added.

Next, the determination apparatus 10 will be described. As shown in FIG. 1, the determination apparatus 10 includes a communication unit 11, a storage unit 12, and a control unit 13. The determination apparatus 10 collects information regarding communication performed by the devices connected thereto. Here, the determination apparatus 10 collects information regarding communication in order to detect unauthorized communication. The determination apparatus 10 determines whether or not sufficient information has been collected.

The determination apparatus 10 can also analyze the collected information, and generate and output information for detecting unauthorized communication. Furthermore, the determination apparatus 10 may detect unauthorized communication using the generated information. For example, the determination apparatus 10 can generate a whitelist of patterns of communication based on the collected information, and detect unauthorized communication by using the generated whitelist.

The communication unit 11 performs, for example, converting the protocol for packets exchanged between: the general-purpose device 20 and the IoT device 30; and the network 40, and causes the determination apparatus 10 to function as a gateway. The communication unit 11 captures packets, and passes the captured packets to the control unit 13. The communication unit 11 can also perform communication control to, for example, block the general-purpose device 20 and the IoT device 30.

The storage unit 12 is a storage device such as an HDD (Hard Disk Drive), an SSD (Solid State Drive), or an optical disc. Note that the storage unit 12 may be a data-rewritable semiconductor memory such as a RAM (Random Access Memory), a flash memory, an NVSRAM (Non Volatile Static Random Access Memory), or the like. The storage unit 12 stores an OS (Operating System) and various kinds of programs that are to be executed by the determination apparatus 10. Furthermore, the storage unit 12 stores various kinds of information that are used in the execution of the programs.

The control unit 13 controls the determination apparatus 10 overall. The control unit 13 is an electronic circuit such as a CPU (Central Processing Unit) or an MPU (Micro Processing Unit), or an integrated circuit such as an ASIC (Application Specific Integrated Circuit) or an FPGA (Field Programmable Gate Array), for example. The control unit 13 includes an internal memory for storing programs that define various kinds of processing procedures, or control data, and the control unit 13 performs various kinds of processing using the internal memory. The control unit 13 also functions as various kinds of processing units as a result of various kinds of programs operating. For example, the control unit 13 includes a collection unit 131, an extraction unit 132, a calculation unit 133, and a determination unit 134.

The collection unit 131 collects information regarding communication performed by the IoT device 30. The collection unit 131 can collect information regarding communication by reading the packets captured by the communication unit 11.

Not only the IoT device 30, but also the general-purpose device 20 is connected to the determination apparatus 10. The general-purpose device 20 may be used for web browsing or the like, and the number of communication destinations, the number of protocols to be used, and the number of ports to be used are likely to be large. In contrast, the purpose of communication performed by the IoT device 30 is limited, and therefore the number of communication destinations, the number of protocols to be used, and the number of ports to be used are likely to be small compared to the general-purpose device.

In addition, the general-purpose device 20 may perform communication with a communication destination that is specific to the OS mounted thereon. For example, if Android (registered trademark) is mounted on the general-purpose device 20, the general-purpose device 20 may communicate with GooglePlay, which is a store for OS extensions (a reference URL: https://www.android.com/intl/ja_jp/play/)

Therefore, in the present embodiment, in order to analyze communication performed by the IoT device 30, the collection unit 131 determines a device that is neither a device that communicates with a predetermined specific communication destination, nor a device of which any of the number of communication destinations, the number of protocols that are used, and the number of ports that are used is no less than a predetermined number, as the IoT device 30 from among the devices connected thereto, and collects information regarding communication performed by the device that has been determined as the IoT device 30.

For example, the determination apparatus 10 stores a list of communication destinations that are specific to each OS as blacklist, and if a communication destination of packets is included in the blacklist, the determination apparatus 10 can determine that the device that performs communication related to the packets is the general-purpose device 20.

The extraction unit 132 extracts patterns used for detecting unauthorized communication performed by the IoT device 30 from information collected by the collection unit 131. For example, the extraction unit 132 extracts any of: a communication destination; a protocol; a communication amount for each connection; a time zone in which communication occurs; and the period of intervals at which communication occurs, regarding communication performed by the IoT device 30, as a pattern of the communication.

The extraction unit 132 may include, for example, a destination IP address in patterns of communication as a communication destination. Also, the extraction unit 132 may include, for example, information indicating whether the protocol is TCP or UDP, in patterns of communication. Also, the extraction unit 132 may include, for example, a communication amount for each connection, in patterns of communication. Also, the extraction unit 132 may set time windows with a predetermined length for each time zone, and extract a time window that includes a point in time at which communication occurred, as a pattern. Also, the extraction unit 132 may extract an interval between points in time at which communication occurred, as a pattern. Also, a pattern of communication may be any one or a combination of the elements of a so-called 5-tuple of packets. Note that, when the extraction target is a continuous amount such as a communication amount or time, the extraction unit 132 can extract a value obtained by discretizing the continuous amount as a pattern.

Here, in general, IoT devices are characterized by performing communication according to an execution span such as daily or weekly rather than performing all kinds of available communication right after being connected to the Internet.

Therefore, the determination apparatus 10 may not be able to collect sufficient information regarding communication performed by the IoT device 30 right after the IoT device 30 is connected to the Internet. Conversely, after a predetermined unit of time such as one week or one month has elapsed, it is envisaged that only similar kinds of communication periodically occur, and it may be difficult for the determination apparatus 10 to acquire useful information even if the determination apparatus 10 continues collecting information.

Therefore, in the embodiment, attention is paid to a change in the cumulative value of the number of patterns extracted from the collected information, and the determination apparatus 10 is stopped from collecting information upon the change converging, and thus the efficiency of processing is improved.

Therefore, the calculation unit 133 approximates the change in the cumulative value of the number of patterns to a function that expresses a predetermined curve, thereby calculating the degree of convergence of the change. Upon the determination unit 134 determining that the degree of convergence is no less than a predetermined value, the determination apparatus 10 stops collecting information.

Figure 2:
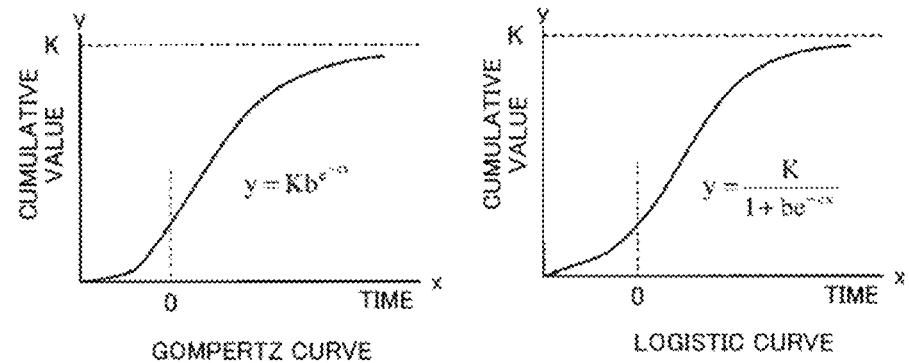
FIG. 2 is a diagram illustrating curves.

Here, the calculation unit 133 can approximate a change in the cumulative value of the number of patterns to a function that expresses the Gompertz curve as shown in FIG. 2. FIG. 2 is a diagram illustrating curves. As shown in FIG. 2, the Gompertz curve converges to K when the value on the horizontal axis is infinite.

For example, as shown in FIG. 2, when x denotes the period of time elapsed from when the collection of information regarding the IoT device 30 was started, and $y=Kb e^{-cx}$ is satisfied, the calculation unit 133 can calculate the convergence rate at the time x=t is satisfied, by $Kbe^{-ct}/K=be^{-ct}$. Note that K, b, and c are all positive values determined through approximation processing, and 0<b<1 is satisfied.

Figure 3:
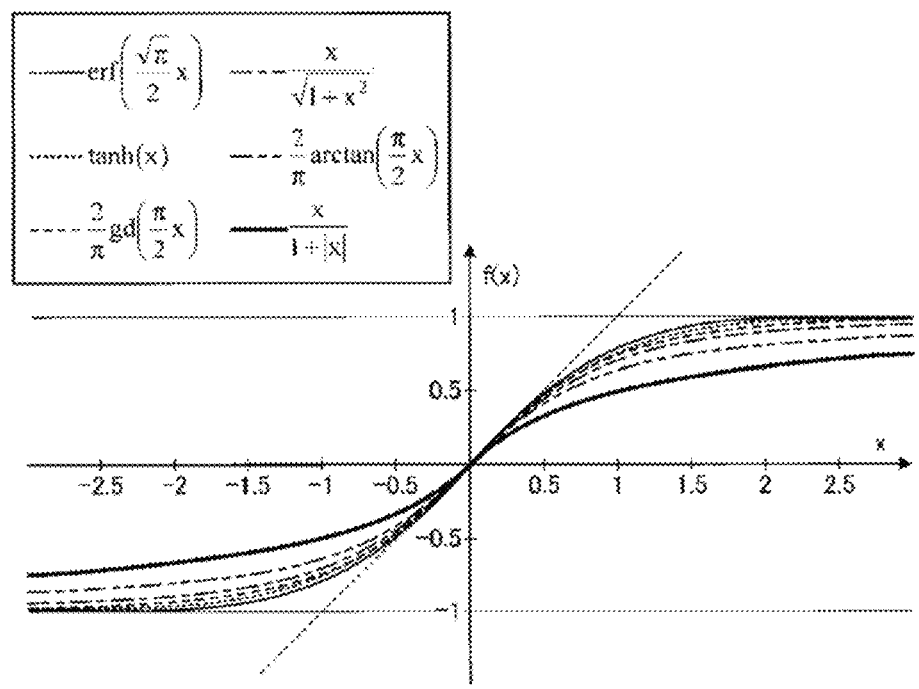
FIG. 3 is a diagram illustrating curves.

Alternatively, the calculation unit 133 may use the logistic curve shown in FIG. 2 to perform approximation. In addition, the calculation unit 133 may use various curves as shown in FIG. 3 to perform approximation. FIG. 3 is a diagram illustrating curves.

Although the horizontal axis indicates time in the example shown in FIG. 2, the horizontal axis may be the logarithm of time, the amount of communication, the logarithm of the amount of communication, or the like. That is to say, the calculation unit 133 calculates the degree of convergence by approximating a change in the cumulative value of the number of patterns to a function that includes, as a variable, the period of time elapsed from when the collection of information regarding the IoT device 30 was started, the logarithm of the period of time, the cumulative amount of communication that has occurred in the IoT device 30, the logarithm of the cumulative amount of communication, or the cumulative total number of connections that have occurred.

Here, approximation processing performed by the calculation unit 133 will be described for each variable setting with reference to FIGS. 4, 5, and 6. Note that each figure visually expresses the processing performed by the calculation unit 133, for the purpose of illustration. Note that plotting and fitting refer to the same processing as approximation to a function.

Figure 4:
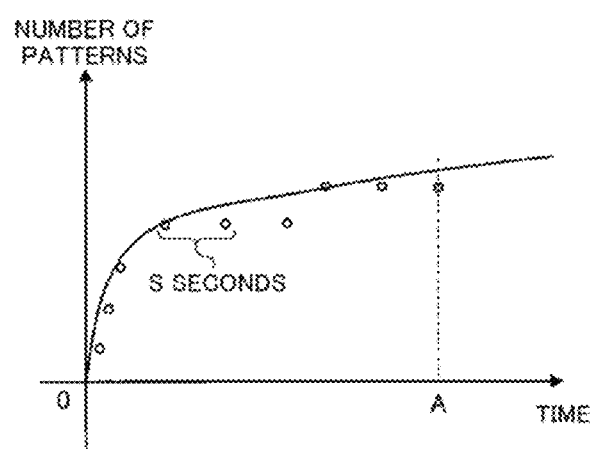
FIG. 4 is a diagram illustrating fitting in a case where time is used as a variable.

FIG. 4 is a diagram illustrating fitting in a case where time is used as a variable. The calculation unit 133 plots cumulative values of the number of patterns from time 0 to time A every S second. The calculation unit 133 fits the plotted cumulative values to a curve, and calculates parameters. Thereafter, the calculation unit 133 calculates the convergence rate at time A based on the calculated parameters. For example, in the case of performing fitting to the Gompertz curve, the calculation unit 133 calculates K, b, and c in $y=Kbe^{-cx}$ and calculates a convergence rate $be^{-cA}$.

Figure 5:
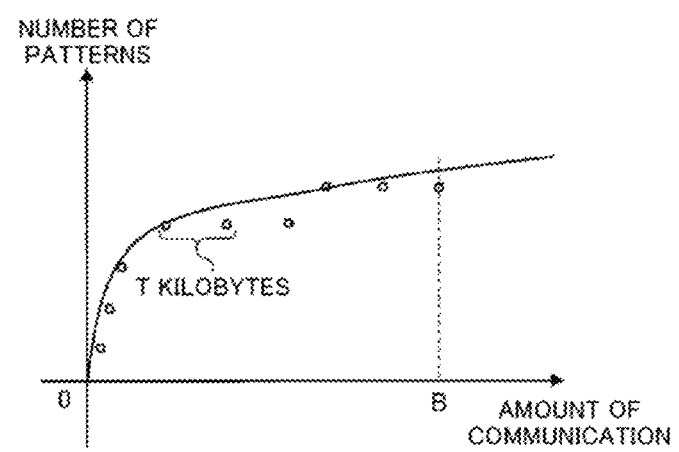
FIG. 5 is a diagram illustrating fitting in a case where the amount of communication is used as a variable.

FIG. 5 is a diagram illustrating fitting in a case where the amount of communication is used as a variable. The calculation unit 133 plots cumulative values of the number of patterns from 0 kilobytes to B kilobytes every T kilobyte of the amount of communication. The calculation unit 133 fits the plotted cumulative values to a curve, and calculates parameters. Thereafter, the calculation unit 133 calculates the convergence rate at the time when the amount of communication is B kilobytes, based on the calculated parameters. For example, in the case of performing fitting to the Gompertz curve, the calculation unit 133 calculates K, b, and c in $y=Kbe^{-cx}$ and calculates a convergence rate $be^{-cB}$.

Figure 6:
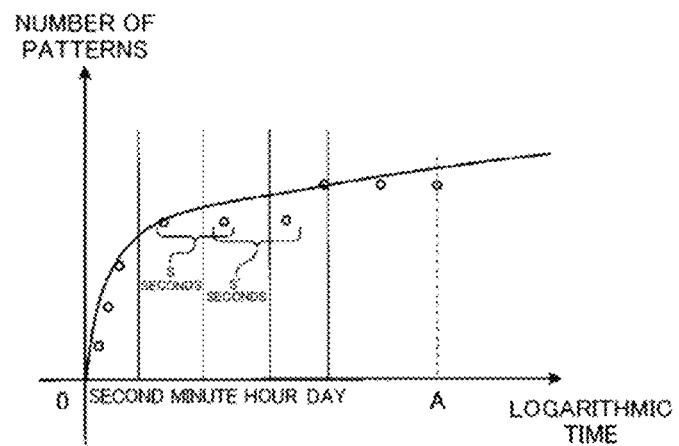
FIG. 6 is a diagram illustrating fitting in a case where time or the amount of communication is used as a variable.

FIG. 6 is a diagram illustrating fitting in a case where time or the amount of communication is used as a variable. The calculation unit 133 plots cumulative values of the number of patterns from time 0 to when the logarithm of time reaches A every predetermined second. The calculation unit 133 fits the plotted cumulative values to a curve, and calculates parameters. Thereafter, the calculation unit 133 calculates the convergence rate at time A based on the calculated parameters. For example, in the case of performing fitting to the Gompertz curve, the calculation unit 133 calculates K, b, and c in $y=Kbe^{-cx}$ and calculates a convergence rate $be^{-cA}$.

The determination unit 134 determines whether or not the degree of convergence is no less than a predetermined value. For example, the determination unit 134 determines whether or not the degree of convergence is no less than 0.95. If it is determined that the convergence rate is no less than 0.95, the determination apparatus 10 determines that sufficient information has been collected and stops the collection unit 131 from collecting information.

If it is determined that the degree of convergence is less than the predetermined value, the determination unit 134 further determines whether or not a predetermined period has elapsed from when the collection of information regarding the IoT device 30 was started. Thus, if the cumulative value does not converge even after a certain period has elapsed from when the collection of information was started, the determination apparatus 10 can stop collecting information.

[Processing According to First Embodiment]

Figure 7:
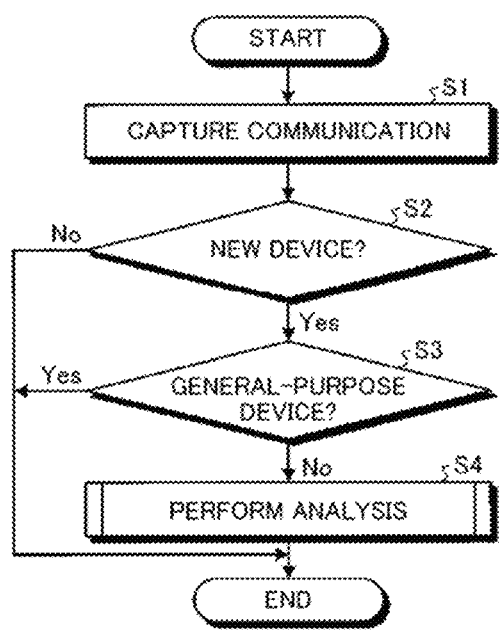
FIG. 7 is a flowchart showing processing performed by the determination apparatus according to the first embodiment.
Figure 8:
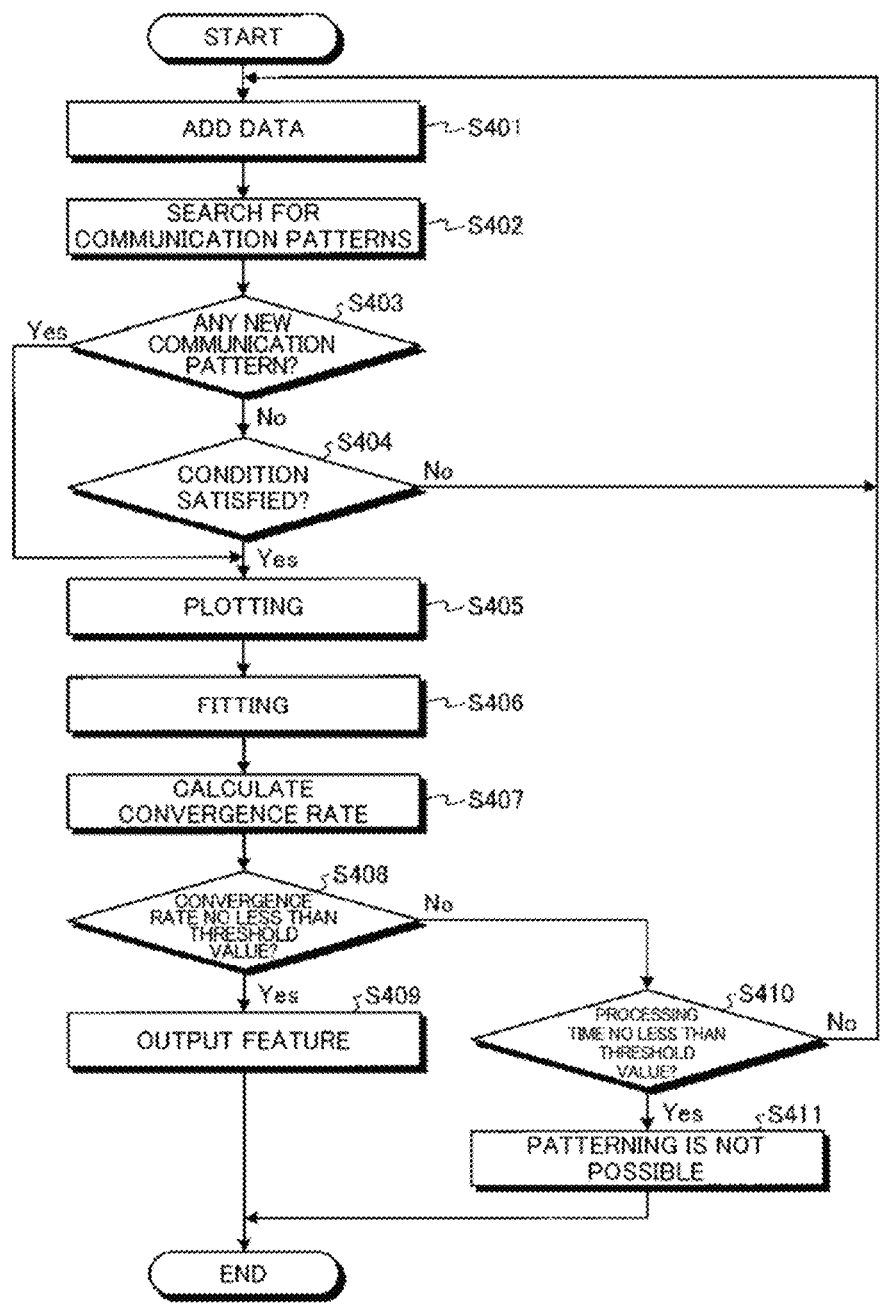
FIG. 8 is a flowchart showing processing performed by the determination apparatus according to the first embodiment.

FIGS. 7 and 8 are flowcharts showing processing performed by the determination apparatus according to the first embodiment. First, as shown in FIG. 7, the determination apparatus 10 captures communication (step S1). Next, the determination apparatus 10 determines whether or not the device related to the captured communication is a new device (step S2). For example, a new device is a newly added general-purpose device 20 or IoT device 30, and is a device that has not been subjected to information collection and analysis performed by the determination apparatus 10. If the device related to communication is not a new device (No in step S2), the determination apparatus 10 terminates processing.

On the other hand, if the device related to communication is a new device (Yes in step S2), the determination apparatus 10 determines whether or not the device is a general-purpose device (step S3). Upon determining that the device is a general-purpose device (Yes in step S3), the determination apparatus 10 terminates processing. On the other hand, upon determining that the device is not a general-purpose device (No in step S3), the determination apparatus 10 performs analysis (step S4).

The processing in step S4 will be described in detail with reference to FIG. 8. First, the determination apparatus 10 acquires data from the captured packets, and adds the data as analysis data (step S401). Thereafter, the determination apparatus 10 searches for and extracts communication patterns from the analysis data (step S402).

If a new communication pattern is included in the extracted communication patterns (Yes in step S403), or if a new communication pattern is not included (No in step S403) but a predetermined condition is satisfied (Yes in step S404), the determination apparatus 10 performs the processing in step S405.

For example, if a certain period has been elapsed after the previous plotting was performed in step S405, the determination apparatus 10 determines that a predetermined condition is satisfied. That is to say, the determination apparatus 10 performs approximation processing and the calculation of the convergence rate on information indicating that a certain period has elapsed without an increase in the cumulative value of the number of patterns.

On the other hand, if a new communication pattern is not included in the extracted communication patterns (No in step S403) and the predetermined condition is not satisfied (No in step S404), the determination apparatus 10 returns to step S401 and performs processing on the next piece of data.

Next, the determination apparatus 10 performs plotting and fitting (steps S405 and S406), and calculates the convergence rate (step S407). That is to say, the determination apparatus 10 approximates a change in the cumulative value to a function that expresses a curve, and also calculates the convergence rate at the time.

Here, if the convergence rate is no less than a threshold value (Yes in step S408), the determination apparatus 10 determines that a change in the cumulative value has converged, and outputs a feature of communication generated from the communication patterns that have been extracted (step S409).

On the other hand, if the convergence rate is less than the threshold value (No in step S408), the determination apparatus 10 determines that a change in the cumulative value has not converged, and further determines that whether or not processing time is no less than a threshold value (step S410). If the processing time is less than the threshold value (No in step S410), the determination apparatus 10 returns to step S401 and performs processing on the next piece of data. If the processing time is no less than the threshold value (Yes in step S410), the determination apparatus 10 determines that patterning is not possible for the communication device (step S411).

[Effects of First Embodiment]

The determination apparatus 10 according to the first embodiment collects information regarding communication performed by the IoT device 30. The determination apparatus 10 extracts patterns used for detecting unauthorized communication performed by the IoT device 30 from information that has been collected. Also, the determination apparatus 10 approximates a change in the cumulative value of the number of patterns to a function that expresses a predetermined curve, thereby calculating the degree of convergence of the change. Also, the determination apparatus 10 determines whether or not the degree of convergence is no less than a predetermined value. Thus, the determination apparatus 10 can determine whether or not the number of extracted patterns has converged, based on the collected information. Therefore, the determination apparatus 10 can collect information without excess or deficiency, and can efficiently collect information regarding communication performed by the IoT device.

The determination apparatus 10 can determine a device that is neither a device that communicates with a predetermined specific communication destination, nor a device of which any of the number of communication destinations, the number of protocols that are used, and the number of ports that are used is no less than a predetermined number, as the IoT device 30 from among the devices connected thereto, and collect information regarding communication performed by the device that has been determined as the IoT device 30. Thus, the determination apparatus 10 can distinguish between the general-purpose device 20 and the IoT device 30.

Also, the determination apparatus 10 can extract any of: a communication destination; a protocol; a communication amount for each connection; a time zone in which communication occurs; and the period of intervals at which communication occurs, regarding communication performed by the IoT device 30, as a pattern of the communication. Thus, the determination apparatus 10 can extract a communication pattern to which the change is expected to converge, by collecting a certain amount of information.

Also, the determination apparatus 10 calculates the degree of convergence by approximating a change in the cumulative value of the number of patterns to a function that includes, as a variable, the period of time elapsed from when the collection of information regarding the IoT device 30 was started, the logarithm of the period of time, the cumulative amount of communication that has occurred in the IoT device 30, the logarithm of the cumulative amount of communication, or the cumulative total number of connections that have occurred. Thus, the determination apparatus 10 can evaluate approximation and convergence using a method that is suitable for the properties of the IoT device 30.

If it is determined that the degree of convergence is less than a predetermined value, the determination apparatus 10 further determines whether or not a predetermined period has elapsed from when the collection of information regarding the IoT device 30 was started. Thus, the determination apparatus 10 can stop processing if it is envisaged that a change in the cumulative value will not converge, or it will take an enormous amount of time until the change converges.

[System Configuration, Etc.]

The constituent elements of the apparatus in the drawings show functional concepts and need not be necessarily formed as shown in the drawings in terms of the physical configurations thereof. That is to say, a specific mode in which the apparatuses are dispersed or integrated is not limited to the mode shown in the drawings, and all or one or more of the apparatuses may be functionally or physically dispersed or integrated in any units according to various kinds of loads, usage conditions, and so on. Furthermore, all or given one or more of the processing functions performed by the apparatuses may be realized by a CPU and a program that is analyzed and executed by the CPU, or may be realized as hardware using wired logic.

Also, among the various kinds of processing described in the present embodiment, all or part of processing that is described as processing that is automatically performed may be manually performed, and all or part of processing that is described as processing that is manually performed may be automatically performed using a well-known method. In addition, the processing procedures, control procedures, specific names, various kinds of data, and information including parameters described in the above description or the drawings may be freely changed unless otherwise specified.

[Program]

In one embodiment, the determination apparatus 10 may be implemented by installing a determination program that executes the above-described determination processing, as packaged software or online software, on a desired computer. For example, by causing an information processing apparatus to execute the above-described determination program, it is possible to cause the information processing apparatus to function as the determination apparatus 10. The information processing apparatus mentioned here may be a desk top or laptop personal computer. In addition, the scope of the information processing apparatus also includes mobile communication terminals such as a smartphone, a mobile phone, and a PHS (Personal Handyphone System), and slate terminals such as a PDA (Personal Digital Assistant), for example.

Also, it is possible to use a terminal apparatus to be used by a user as a client, and implement the determination apparatus 10 as an analysis server apparatus that provides the client with a service related to the above-described determination processing. For example, the analysis server apparatus is implemented as a server apparatus to which captured packets are input and outputs information indicating whether or not the change has converged. If this is the case, the analysis server apparatus may be implemented as a Web server, or a cloud that provides a service related to the above-described determination processing through outsourcing.

Figure 9:
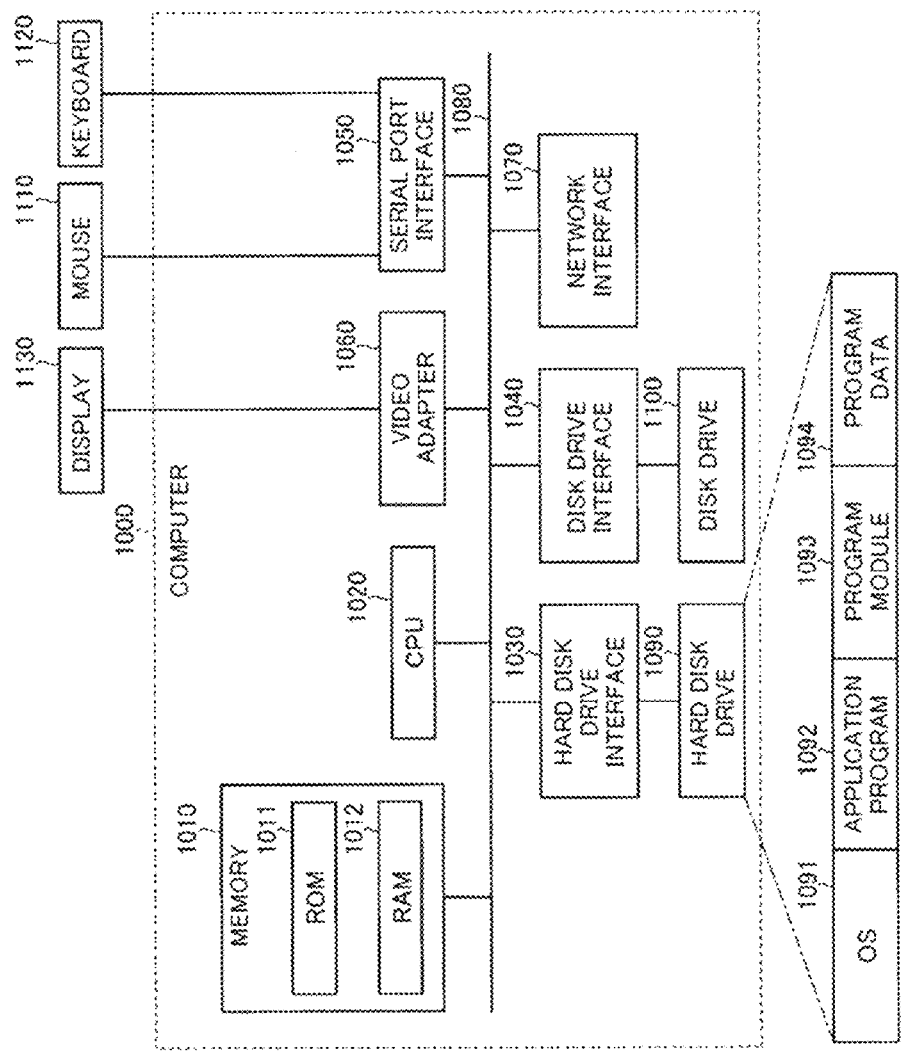
FIG. 9 is a diagram showing an example of a computer that executes a determination program.

FIG. 9 is a diagram showing an example of a computer that executes a determination program. A computer 1000 includes a memory 1010 and a CPU 1020, for example. The computer 1000 also includes a hard disk drive interface 1030, a disk drive interface 1040, a serial port interface 1050, a video adapter 1060, and a network interface 1070. These units are connected via a bus 1080.

The memory 1010 includes a ROM (Read Only Memory) 1011 and a RAM 1012. The ROM 1011 stores a boot program such as a BIOS (Basic Input Output System) program, for example. The hard disk drive interface 1030 is connected to a hard disk drive 1090. The disk drive interface 1040 is connected to a disk drive 1100. For example, a removable storage medium such as a magnetic disc or an optical disc is inserted into the disk drive 1100. The serial port interface 1050 is connected to a mouse 1110 and a keyboard 1120, for example. The video adapter 1060 is connected to a display 1130, for example.

The hard disk drive 1090 stores an OS 1091, an application program 1092, a program module 1093, and program data 1094, for example. That is to say, a program that defines each kind of processing performed by the determination apparatus 10 is implemented as the program module 1093 in which codes that are executable by the computer are written. The program module 1093 is stored on the hard disk drive 1090, for example. For example, the program module 1093 for executing the same processing as the processing performed by the functional element of the determination apparatus 10 is stored on the hard disk drive 1090. Note that the hard disk drive 1090 may be replaced with an SSD.

Setting data that is used in processing according to the above-described embodiment is stored on the memory 1010 or the hard disk drive 1090, for example, as program data 1094. The CPU 1020 reads out the program module 1093 or the program data 1094 stored on the memory 1010 or the hard disk drive 1090 to the RAM 1012, and executes the processing according to the above-described embodiment as necessary.

Note that the program module 1093 and the program data 1094 are not limited to being stored on the hard disk drive 1090, and may be stored on a removable storage medium, for example, and read out by the CPU 1020 via the disk drive 1100 or the like. Alternatively, the program module 1093 and the program data 1094 may be stored in another computer connected via a network (a LAN (Local Area Network), a WAN (Wide Area Network), or the like). The program module 1093 and the program data 1094 may be read out by the CPU 1020 from the other computer via the network interface 1070.

REFERENCE SIGNS LIST

10 Determination apparatus
11 Communication unit
12 Storage unit
13 Control unit
20 General-purpose device
30 IoT device
40 Network
50 Server
131 Collection unit
132 Extraction unit
133 Calculation unit
134 Determination unit

The invention claimed is:

1. A determination apparatus comprising:
a memory; and
a processor coupled to the memory and programmed to execute a process comprising:
collecting information regarding communication performed by a device;
extracting patterns that are used to detect unauthorized communication performed by the device, from the information collected by the collecting;
approximating a change in a cumulative value of a number of patterns to a function that expresses a predetermined curve, thereby calculating a degree of convergence of the change in the cumulative value of the number of patterns;
determining whether or not the degree of convergence of the change in the cumulative value of the number of patterns is no less than a predetermined value;
upon determining that the degree of convergence of the change in the cumulative value of the number of patterns is less than the predetermined value, determining whether or not a predetermined period has elapsed from when the collection of information regarding the device was started; and
upon determining that the predetermined period has elapsed from when the collection of information regarding the device was started, determining that patterning is not possible for the device and stopping the information collection.

2. The determination apparatus according to claim 1, wherein the collecting determines a device, as said device, that is neither a first device that communicates with a predetermined specific communication destination, nor a second device of which any of a first number of communication destinations, a second number of protocols that are used, and a third number of ports that are used is no less than a predetermined number, as an IoT device from among devices connected thereto, and collects the information regarding the communication performed by the device that has been determined as the IoT device.

3. The determination apparatus according to claim 1, wherein the extracting extracts any of: a communication destination; a protocol; a communication amount for each connection; a time zone in which the communication occurs; and a period of intervals at which the communication occurs, regarding the communication performed by the device, as a pattern of the communication.

4. The determination apparatus according to claim 1, wherein the calculating calculates the degree of convergence by approximating the change in the cumulative value of the number of patterns to a function that includes, as a variable, a period of time elapsed from when the collection of information regarding the device was started, a logarithm of the period of time, a cumulative amount of communication that has occurred in the device, a logarithm of the cumulative amount of communication, or a cumulative total number of connections that have occurred.

5. The determination apparatus according to claim 1, wherein the process further comprises upon said determining that the degree of convergence of the change in the cumulative value of the number of patterns is less than the predetermined value and upon determining that the predetermined period has not elapsed from when the collection of information regarding the device was started, performing again said collecting the information regarding the communication performed by the device.

6. The determination apparatus according to claim 1, wherein the process further comprises upon determining that the degree of convergence of the change in the cumulative value of the number of patterns is not less than the predetermined value, outputting a feature of communication generated from the patterns that have been extracted.

7. A determination method that is to be performed by a computer, comprising:
  collecting information regarding communication performed by a device;
  extracting patterns that are used to detect unauthorized communication performed by the device, from the information collected in the collecting;
  approximating a change in a cumulative value of a number of patterns to a function that expresses a predetermined curve, thereby calculating a degree of convergence of the change in the cumulative value of the number of patterns;
  determining whether or not the degree of convergence of the change in the cumulative value of the number of patterns is no less than a predetermined value;
  upon determining that the degree of convergence of the change in the cumulative value of the number of patterns is less than the predetermined value, determining whether or not a predetermined period has elapsed from when the collection of information regarding the device was started; and
  upon determining that the predetermined period has elapsed from when the collection of information regarding the device was started, determining that patterning is not possible for the device and stopping the information collection.

8. The determination method according to claim 7, further comprising upon said determining that the degree of convergence of the change in the cumulative value of the number of patterns is less than the predetermined value and upon determining that the predetermined period has not elapsed from when the collection of information regarding the device was started, performing again said collecting the information regarding the communication performed by the device.

9. The determination method according to claim 7, further comprising upon determining that the degree of convergence of the change in the cumulative value of the number of patterns is not less than the predetermined value, outputting a feature of communication generated from the patterns that have been extracted.

10. A non-transitory computer-readable recording medium having stored therein a program, for determination, that causes a computer to execute a process, comprising:
  collecting information regarding communication performed by a device;
  extracting patterns that are used to detect unauthorized communication performed by the device, from the information collected in the collecting;
  approximating a change in a cumulative value of a number of patterns to a function that expresses a predetermined curve, thereby calculating a degree of convergence of the change in the cumulative value of the number of patterns;
  determining whether or not the degree of convergence of the change in the cumulative value of the number of patterns is no less than a predetermined value;
  upon determining that the degree of convergence of the change in the cumulative value of the number of patterns is less than the predetermined value, determining whether or not a predetermined period has elapsed from when the collection of information regarding the device was started; and
  upon determining that the predetermined period has elapsed from when the collection of information regarding the device was started, determining that patterning is not possible for the device and stopping the information collection.

11. The non-transitory computer-readable recording medium according to claim 10, wherein the process further comprises upon said determining that the degree of convergence of the change in the cumulative value of the number of patterns is less than the predetermined value and upon determining that the predetermined period has not elapsed from when the collection of information regarding the device was started, performing again said collecting the information regarding the communication performed by the device.

12. The non-transitory computer-readable recording medium according to claim 10, wherein the process further comprises upon determining that the degree of convergence of the change in the cumulative value of the number of patterns is not less than the predetermined value, outputting a feature of communication generated from the patterns that have been extracted.

* * * * *